US012637523B2

(12) United States Patent (10) Patent No.: US 12,637,523 B2
Takahashi et al. (45) Date of Patent: May 26, 2026

(54) POLYMERIZATION CATALYST COMPOSITION, METHOD FOR PRODUCING POLYMERIZATION CATALYST COMPOSITION, AND METHOD FOR PRODUCING CONJUGATED DIENE POLYMER

(71) Applicants: DIC Corporation, Tokyo (JP); National University Corporation Nagaoka University of Technology, Nagaoka (JP)

(72) Inventors: Akinori Takahashi, Ichihara (JP); Hiroaki Nakano, Ichihara (JP); Katsuhiko Takenaka, Nagaoka (JP); Tomoyuki Toda, Nagaoka (JP)

(73) Assignees: DIC Corporation, Tokyo (JP); National University Corporation Nagaoka University of Technology, Nagaoka (JP)

( * ) Notice: Subject to any disclaimer, the term of this patent is extended or adjusted under 35 U.S.C. 154(b) by 604 days.

(21) Appl. No.: 18/021,081

(22) PCT Filed: Aug. 27, 2021

(86) PCT No.: PCT/JP2021/031464
§ 371 (c)(1),
(2) Date: Feb. 13, 2023

(87) PCT Pub. No.: WO2022/045282
PCT Pub. Date: Mar. 3, 2022

(65) Prior Publication Data
US 2023/0340167 A1 Oct. 26, 2023

(30) Foreign Application Priority Data
Aug. 27, 2020 (JP) ................................. 2020-143898

(51) Int. Cl.
*C08F 4/606* (2006.01)
*C08F 4/54* (2006.01)
*C08F 236/06* (2006.01)

(52) U.S. Cl.
CPC ................ *C08F 4/606* (2013.01); *C08F 4/54* (2013.01); *C08F 236/06* (2013.01)

(58) Field of Classification Search
CPC . C08F 4/606; C08F 4/54; C08F 236/06; B01J 31/123; B01J 31/18
See application file for complete search history.

(56) References Cited

U.S. PATENT DOCUMENTS 6,018,007 A * 1/2000 Lynch ..................... C08F 36/04
526/335
2018/0298135 A1* 10/2018 Kimura ................. C08F 210/02

FOREIGN PATENT DOCUMENTS

| CN | 102532368 A | 7/2012 |
| CN | 104231133 A | 12/2014 |
| CN | 104744612 A | 7/2015 |
| JP | H11-158207 A | 6/1999 |
| JP | 2000-034320 A | 2/2000 |
| JP | 2002-512249 A | 4/2002 |
| JP | 3828340 B2 | 10/2006 |
| JP | 4699606 B2 | 6/2011 |
| WO | 99/54335 A1 | 10/1999 |
| WO | 2015/101477 A1 | 7/2015 |

OTHER PUBLICATIONS

English machine translation of CN102532368 (2012).*
Office Action mailed Mar. 14, 2023, issued for Japanese Patent Application No. 2022-545724 and English translation thereof.
Supplementary European Search Report mailed Aug. 7, 2024, issued for EP21861703.3.
International Search Report mailed Oct. 19, 2021, issued for PCT/JP2021/031464 and English translation thereof.

* cited by examiner

*Primary Examiner* — Richard M Rump
(74) *Attorney, Agent, or Firm* — Troutman Pepper Locke LLP; James E. Armstrong, IV

(57) ABSTRACT

A polymerization catalyst composition contains a rare earth element carboxylate, a phosphate ester represented by the following general formula (1):

[Formula 1]

$$O{=}P(OR)_3 \tag{1}$$

(wherein Rs are each independently an alkyl group having 5 to 20 carbon atoms), and water.

5 Claims, No Drawings

POLYMERIZATION CATALYST COMPOSITION, METHOD FOR PRODUCING POLYMERIZATION CATALYST COMPOSITION, AND METHOD FOR PRODUCING CONJUGATED DIENE POLYMER

TECHNICAL FIELD

The present invention relates to a polymerization catalyst composition, a method for producing a polymerization catalyst composition, and a method for producing a conjugated diene polymer.

The present application claims priority from Japanese Patent Application No. 2020-143898, filed Aug. 27, 2020, the content of which is incorporated herein by reference.

BACKGROUND ART

In a tire industry, the demand for high cis-butadiene rubber that is effective for improvement of automobile fuel efficiency and suppression of cracking due to a decrease in rolling resistance has been recently increased. The high cis-butadiene rubber is produced by polymerization of 1,3-butadiene using as a catalyst aliphatic neodymium (hereinafter sometimes referred to as "neodymium soap" or "Nd soap") (for example, see PTL 1).

It is conventionally known that an excess of a fatty acid (hereinafter sometimes simply referred to as "free fatty acid") relative to Nd is mixed to prevent precipitation of Nd soap during storage and to improve storage stability. For example, PTL 2 discloses a polymerization catalyst composition containing neodymium soap, a free fatty acid, and an organic solvent.

CITATION LIST

Patent Literature

PTL 1: Japanese Patent No. 3828340
PTL 2: Japanese Patent No. 4699606

SUMMARY OF INVENTION

Technical Problem

However, the free fatty acid deactivates a polymerization catalyst, and therefore it is necessary that a scavenger (for example, an organoaluminum compound) be mixed during a polymerization reaction to remove the free fatty acid in the reaction system.

The scavenger, such as an organoaluminum compound, is expensive, and therefore the production cost of the polymerization catalyst is increased. Therefore, the development of Nd soap containing no free fatty acid is required.

The present invention has been made in view of the circumstances, and an object of the present invention is to provide a polymerization catalyst composition having high storage stability and favorable catalytic activity, a method for producing the polymerization catalyst composition, and a method for producing a conjugated diene polymer using the polymerization catalyst composition.

Solution to Problem

The present invention encompasses the following aspects.

(1) A polymerization catalyst composition containing a rare earth element carboxylate and a phosphate ester represented by the following general formula (1).

[Formula 1]

$$O{=}P(OR)_3 \tag{1}$$

(wherein Rs are each independently an alkyl group having 5 to 20 carbon atoms.)

(2) The polymerization catalyst composition according to (1), wherein the rare earth element carboxylate is a carboxylate containing one or more types of rare earth elements selected from the group consisting of neodymium, gadolinium, praseodymium, lanthanum, samarium, and yttrium.

(3) The polymerization catalyst composition according to (1) or (2), wherein a content of the phosphoric acid ester is 0.01 to 20 eq relative to the rare earth element contained in the rare earth element carboxylate.

(4) The polymerization catalyst composition according to any one of (1) to (3), wherein a content of water is 0.5 eq or less relative to the rare earth element contained in the rare earth element carboxylate.

(5) The polymerization catalyst composition according to any one of (1) to (4), wherein a content of free fatty acid is 0.1 eq or less relative to the rare earth element contained in the rare earth element carboxylate.

(6) A method for producing the polymerization catalyst composition according to any one of (1) to (5), the method including: a step (a) of adjusting a content of a phosphoric acid ester represented by the general formula (1) within a range of 0.01 to 20 eq relative to the rare earth element contained in the rare earth element carboxylate; a step (b) of adjusting a content of water to 0.5 eq or less relative to the rare earth element contained in the rare earth element carboxylate; and a step (c) of adjusting a total content of free fatty acid and water to 0.6 eq or less relative to the rare earth element contained in the rare earth element carboxylate.

(7) A method for producing a conjugated diene polymer including: polymerizing a conjugated diene monomer in the presence of the polymerization catalyst composition according to any one of (1) to (5).

Advantageous Effects of Invention

The present invention can provide a polymerization catalyst composition having high storage stability and favorable catalytic activity without mixing a free fatty acid that requires a scavenger during a polymerization reaction. The present invention can also provide a method for producing a conjugated diene polymer at reduced production cost.

DESCRIPTION OF EMBODIMENTS

<Polymerization Catalyst Composition>

A polymerization catalyst composition according to an embodiment contains a rare earth element carboxylate and a phosphoric acid ester represented by the general formula (1) below (hereinafter sometimes referred to as "phosphoric acid ester (P)").

The polymerization catalyst composition according to the embodiment is preferably used as a polymerization catalyst for production of a conjugated diene polymer, more preferably used in production of a butadiene polymer, and further preferably used in production of a butadiene polymer containing 96% or more of cis-1,4-butadiene.

(Rare Earth Element Carboxylate)

In the embodiment, the rare earth element carboxylate is not particularly limited as long as it can be prepared using a carboxylic acid and a water-soluble rare earth element salt, a rare earth element oxide, or the like.

Examples of the carboxylic acid used in preparation of the rare earth element carboxylate include aliphatic, cycloaliphatic, alicyclic, and aromatic mono- and poly-basic carboxylic acids. The carboxylic acid may be a saturated or unsaturated, linear or branched carboxylic acid. An organic carboxylic acid may be a natural or synthetic carboxylic acid or a mixture thereof. Examples of natural carboxylic acid, although usually refined, include linear and branched carboxylic acids, a mixture such as tall oil, and a cyclic carboxylic acid such as naphthenic acid. Various synthetic carboxylic acids, especially an aliphatic or alicyclic monocarboxylic acid or a mixture thereof are useful. In particular, the carboxylic acid is preferably a long-chain branched carboxylic acid.

The number of carbon atoms of the organic carboxylic acid is preferably within the range of 1 to 32, more preferably within the range of 5 to 25, and further preferably within the range of 8 to 22. When the mixture is utilized, C5, C2, or lower than C6 organic carboxylic acid can be utilized as one or more of the carboxylic acids in the mixture. The mixture preferably contains smaller amounts of C6 or lower carboxylic acids than contained C6 or higher carboxylic acids.

Examples of useful organic carboxylic acids include commercially available mixtures of two or more carboxylic acids such as isopentanoic acid, hexanoic acid, 2-ethylbutyric acid, nonanoic acid, decanoic acid, 2-ethylhexanoic acid, isooctanoic acid, octanoic acid, isononanoic acid, neodecanoic acid (versatic acid), undecylenic acid, lauric acid, palmitic acid, stearic acid, oleic acid, linoleic acid, and naphthenic acid. The acid number of a preferred naphthenic acid is about 160 to about 300 mgKOH/g. A mixture of carboxylic acids is suitable for use.

Specific examples of a preferable carboxylic acid include neodecanoic acid, 2-ethyl hexanoic acid, naphthenic acid (the acid number is preferably about 160 to about 300 mgKOH/g), 2-methylbutanoic acid, 3-methylbutanoic acid, 2,2-dimethylpropionic acid, 3,5-dimethylhexanoic acid, 2-ethylpentanoaic acid, 2,5-dimethylhexanoic acid, 3-ethyl-hexanoic acid, 2,2,4-trimethylhexanoic diacid, 3,3,4-trimethylhexanoic diacid, octanoic acid, neodecanoic acid, 2,6-dimethyloctanoic acid, 4,6-dimethyloctanoic acid, 2,4,6-trimethyloctanoic acid, and 2,4,6-trimethylnonanoic acid.

In particular, the carboxylic acid is more preferably naphthenic acid (preferably having an acid number of about 160 to about 300 mgKOH/g), neodecanoic acid, octanoic acid, or 2-ethylhexanoic acid, and further preferably neodecanoic acid.

"Neodecanoic acid" herein generally means a mixture of branched carboxylic acids predominately having about 10 carbon atoms. The acid mixture generally has an acid number of about 310 to about 325 mgKOH/g. Commercially available neodecanoic acid is supplied by Momentive under the trade name "VERSATIC 10" (commonly referred to as versatic acid(s)) and by Exxon under the trade name "NEODECANOIC ACID." The term "neodecanoic acid" used herein includes the term "versatic acid" as used in the art.

These carboxylic acids are well known and described in, for example, the fourth edition of Kirk-Othmer, Encyclopedia of Chemical Technology, John Wiley & Son, New York, 1993, Vol. 5, pp. 147 to 192.

In the embodiment, the rare earth element carboxylate is preferably a carboxylate containing one or more types of rare earth elements selected from the group consisting of neodymium, gadolinium, praseodymium, lanthanum, samarium, and yttrium, more preferably a carboxylate containing neodymium, further preferably $(RxCOO)_3Nd$ (wherein Rx is an alkyl group having 1 to 22 carbon atoms), and particularly preferably neodymium neodecanoate.

The content of the rare earth element in the rare earth element carboxylate is preferably within the range of 4.5 to 14% by mass, more preferably within the range of 6 to 10% by mass, and further preferably within the range of 7 to 10% by mass, relative to the whole amount of the polymerization catalyst composition.

When the content of the rare earth element is equal to or more than the lower limit value of the preferable range, the polymerization activity of the polymerization catalyst composition tends to be favorable. In contrast, when the content of the rare earth element is equal to or less than the upper limit value of the preferable range, the storage stability of the polymerization catalyst composition tends to be improved.

One type of the rare earth element carboxylate may be used alone, or two or more types thereof may be used in combination.

In the polymerization catalyst composition according to the embodiment, the content of the rare earth element carboxylate is preferably within the range of 20 to 65% by mass, more preferably within the range of 25 to 50% by mass, and further preferably within the range of 30 to 50% by mass, relative to the whole amount of the polymerization catalyst composition.

When the content of the rare earth element carboxylate is equal to or more than the lower limit value of the preferable range, a transport cost can be reduced. In contrast, when the content of the rare earth element carboxylate is equal to or less than the upper limit value of the preferable range, the storage stability of the polymerization catalyst composition tends to be improved.

(Phosphoric Acid Ester (P))

In the embodiment, the phosphoric acid ester (P) is represented by the following general formula (1).

[Formula 2]

$$O{=}P(OR)_3 \tag{1}$$

(wherein Rs are each independently an alkyl group having 5 to 20 carbon atoms.)

In the general formula (1), Rs are each independently an alkyl group having 5 to 20 carbon atoms. From the viewpoint of reducing the hygroscopicity of the polymerization catalyst composition and improving the storage stability thereof, Rs are each independently preferably an alkyl group having 6 to 20 carbon atoms, and more preferably an alkyl group having 7 to 20 carbon atoms.

Examples of the alkyl group having 5 to 20 carbon atoms of Rs include a pentyl group, a hexyl group, a heptyl group, an octyl group, a nonyl group, a decyl group, an undecyl group, a dodecyl group, a tridecyl group, an isotridecyl group, a tetradecyl group, a pentadecyl group, a hexadecyl group, an isohexadecyl group, a heptadecyl group, an octadecyl group, a nonadecyl group, an icosyl group, and isomers of the alkyl groups.

In particular, from the viewpoint of reducing the hygroscopicity of the polymerization catalyst composition and improving the storage stability thereof, Rs are preferably a pentyl group, a hexyl group, a heptyl group, an octyl group, a nonyl group, a decyl group, an undecyl group, a dodecyl group, a tridecyl group, an isotridecyl group, a tetradecyl group, a pentadecyl group, a hexadecyl group, an isohexadecyl group, a heptadecyl group, an octadecyl group, or an isomer thereof, more preferably a hexyl group, a heptyl group, an octyl group, a nonyl group, a decyl group, an undecyl group, a dodecyl group, or an isomer thereof, and further preferably a 2-ethylhexyl group.

One type of the phosphoric acid ester (P) may be used alone, or two or more types thereof may be used in combination.

In the polymerization catalyst composition according to the embodiment, the content of the phosphoric acid ester (P) is preferably 0.01 to 20 eq, more preferably 0.05 to 10 eq, and further preferably 0.1 to 5 eq, relative to that of the rare earth element contained in the rare earth element carboxylate.

When the content of the phosphoric acid ester (P) is equal to or more than the lower limit value of the preferable range, the storage stability of the polymerization catalyst composition tends to be improved. When the content of the phosphoric acid ester (P) is equal to or less than the upper limit value of the preferable range, the polymerization activity of the polymerization catalyst composition tends to be favorable.

(Water)

The polymerization catalyst composition according to the embodiment may contain water. Water may contain a trace amount of element to be unavoidably mixed. Water used for the polymerization catalyst composition according to the embodiment is preferably water subjected to a cleaning treatment, such as distilled water, ion exchanged water, and ultra pure water.

In the polymerization catalyst composition according to the embodiment, the content of water is preferably 0.5 eq or less, more preferably 0.4 eq or less, and further preferably 0.3 eq or less, relative to that of the rare earth element contained in the rare earth element carboxylate.

When the content of the water is within the preferable range, each component of the polymerization catalyst composition is easily uniformly dissolved in a solvent.

The water content can be determined by a Karl-Fischer analysis method.

(Free Fatty Acid)

In the polymerization catalyst composition according to the embodiment, the content of the free fatty acid is preferably 0.1 eq or less, more preferably 0.05 eq or less, and further preferably 0.03 eq or less, relative to that of the rare earth element contained in the rare earth element carboxylate. The content of the free fatty acid may be 0 eq, and is practically 0.01 eq or more, relative to that of the rare earth element contained in the rare earth element carboxylate.

When the content of the free fatty acid is within the preferable range, the catalytic activity of the polymerization catalyst composition is unlikely to be deactivated. Therefore, a scavenger is not necessarily used in a polymerization reaction using the polymerization catalyst composition, and the production cost can be reduced.

The content of the free fatty acid can be determined by an acid-base titration.

(Phosphoric Acid Ester (P'))

The polymerization catalyst composition according to the embodiment may contain a phosphoric acid ester represented by the following general formula (2) (hereinafter sometimes referred to as "phosphoric acid ester (P')").

[Formula 3]

$$O{=}P(OR')_3 \quad\quad (2)$$

(wherein R's are each independently an alkyl group having 1 to 4 carbon atoms.)

Examples of the alkyl group having 1 to 4 of R's in the general formula (2) include a methyl group, an ethyl group, a propyl group, a butyl group, and an isomer of each of the alkyl groups.

One type of the phosphoric acid ester (P') may be used alone, or two or more types thereof may be used in combination. In the polymerization catalyst composition according to the embodiment, the content of the phosphoric acid ester (P') is preferably 0.01 to 20 eq, more preferably 0.05 to 10 eq, and further preferably 0.1 to 5 eq, relative to that of the rare earth element contained in the rare earth element carboxylate.

(Organic Solvent)

The polymerization catalyst composition according to the embodiment may contain an organic solvent. Examples of the organic solvent include an aliphatic hydrocarbon-based solvent, a cyclic aliphatic hydrocarbon-based solvent, and an aromatic hydrocarbon-based solvent. Specific examples thereof include hexane, cyclohexane, heptane, methylpentane, methylcyclopentane, an isomer thereof, and a mixture thereof. In particular, the organic solvent is preferably hexane, n-heptane, n-pentane, 3-methylpentane, 2-methylpentane, methylcyclopentane, 2,3-dimethylbutane, toluene, or a mixture thereof, more preferably 3-methylpentane, methylcyclopentane, 2,3-dimethylbutane, toluene, cyclohexane, or an isomer thereof, or a mixture thereof, and further preferably hexane, cyclohexane, heptane, or an isomer thereof, or a mixture thereof.

One type of the organic solvent may be used alone, or two or more types thereof may be used in combination.

The polymerization catalyst composition according to the embodiment contains the rare earth element carboxylate and the phosphoric acid ester represented by the general formula (1) (phosphoric acid ester (P)).

Since the R group has a moderate number of carbon atom, the phosphoric acid ester (P) is easily dissolved in the organic solvent. The phosphoric acid ester (P) is estimated to form a coordinate bond with the rare earth element carboxylate.

The phosphoric acid ester (P) has lower hygroscopicity than a phosphoric acid ester such as $O{=}P(OH)(OR)_2$ and $O{=}P(OH)_2(OR)$. Therefore, an increase in the water content due to moisture absorption is unlikely to occur even when the polymerization catalyst composition according to the present embodiment is stored for a long period of time. The phosphoric acid ester (P) does not exhibit acidity, unlike a phosphoric acid ester such as $O{=}P(OH)(OR)_2$ and $O{=}P(OH)_2(OR)$. Therefore, the phosphoric acid ester (P) is unlikely to be reacted with an activator to be added for activation of the rare earth element carboxylate, such as an organoaluminum, during the polymerization reaction using the polymerization catalyst composition, and is unlikely to reduce the polymerization activity of the polymerization catalyst composition.

The effects are combined, and therefore the polymerization catalyst composition according to the embodiment has high storage stability and favorable catalytic activity.

<Method for Producing Polymerization Catalyst Composition>

A method for producing the polymerization catalyst composition according to the present embodiment includes a step (a) of adjusting the content of the phosphoric acid ester represented by the general formula (1) within the range of 0.01 to 20 eq relative to the rare earth element contained in the rare earth element carboxylate, a step (b) of adjusting the content of water to 0.5 eq or less relative to the rare earth element contained in the rare earth element carboxylate, and a step (c) of adjusting the total content of the free fatty acid and water to 0.6 eq or less relative to the rare earth element contained in the rare earth element carboxylate.

When the contents of the phosphoric acid ester, water, and the free fatty acid in the embodiment are within the afore-mentioned ranges, an order of performing the steps (a), (b), and (c) is not particularly limited, each of the steps may be performed in a desired order, or any of the steps may be performed at the same time.

An example of the method according to the embodiment includes a method including a step (i) of mixing a rare earth element oxide with water, a step (ii) of mixing the organic solvent, the carboxylic acid, and the phosphoric acid ester with the resultant of the step (i), and a step (iii) of heating the resultant of the step (ii).

The reaction temperature in the step (i) is not particularly limited and is typically 0 to 50° C., preferably 10 to 40° C., and more preferably 15 to 30° C.

The reaction time in the step (i) is not particularly limited and is typically 15 minutes to 5 hours, and preferably 30 minutes to 3 hours.

In the step (i), the amount of the mixed rare earth element oxide may be appropriately determined such that the content of the rare earth element in the rare earth element carboxy-late is preferably within the range of 4.5 to 14% by mass, more preferably within the range of 6 to 10% by mass, and further preferably within the range of 7 to 10% by mass, relative to the total mass of the polymerization catalyst composition.

The reaction temperature in the step (ii) is not particularly limited and is typically 20 to 100° C., preferably 30 to 90° C., and more preferably 40 to 80° C.

The reaction time in the step (ii) is not particularly limited and is typically 15 minutes to 5 hours, and preferably 30 minutes to 3 hours.

In the step (ii), the amount of the mixed carboxylic acid may be appropriately determined such that the content of the rare earth element in the rare earth element carboxylate is preferably within the range of 4.5 to 14% by mass, more preferably within the range of 6 to 10% by mass, and further preferably within the range of 7 to 10% by mass, relative to the total mass of the polymerization catalyst composition, and that the total amount of the free fatty acid and water is 0.6 eq or less, preferably 0.5 eq or less, and more preferably 0.4 eq or less, relative to the rare earth element contained in the rare earth element carboxylate.

In the step (ii), the amount of the mixed phosphoric acid ester may be appropriately determined to be, for example, within the range of 0.01 to 20 eq, preferably within the range of 0.05 to 10 eq, and more preferably within the range of 0.1 to 5 eq, relative to the rare earth element contained in the rare earth element carboxylate.

In the step (ii), the amount of the mixed organic solvent may be appropriately determined such that the content of the rare earth element carboxylate is preferably within the range of 1 to 80% by mass, more preferably within the range of 3 to 70% by mass, and further preferably within the range of 5 to 60% by mass, relative to the total mass of the polym-erization catalyst composition.

The reaction temperature in the step (iii) is not particu-larly limited and is typically 70 to 160° C., preferably 80 to 150° C., and more preferably 90 to 140° C.

The reaction time in the step (iii) is not particularly limited and is typically 1 hour to 6 hours, and preferably 1.5 hours to 4.5 hours.

The reaction pressure in the step (iii) is preferably a reduced pressure, more preferably 90 mmHg or less, and further preferably 80 mmHg or less.

The method according to the present embodiment is not limited to the method including the steps (i) to (iii). For example, a method including a step (i') of mixing the carboxylic acid, the phosphoric acid ester, and water, a step (ii') of mixing the rare earth element oxide and the organic solvent with the resultant of the step (i'), and a step (iii') of heating the resultant of the step (ii') may be adopted.

As the reaction conditions in the steps (i'), (ii'), and (iii'), the same reaction conditions in the steps (i), (ii), and (iii) can be adopted.

With the method according to the present embodiment, a polymerization catalyst composition in which the content of the free fatty acid is largely decreased as compared with a conventional catalyst for polymerization of a diene-based monomer is obtained. For the polymerization catalyst com-position, the catalytic activity is unlikely to be deactivated. Therefore, a scavenger is not necessarily used in the polym-erization reaction using the polymerization catalyst compo-sition, and the production cost can be reduced.

The polymerization catalyst composition obtained by the method according to the embodiment contains the rare earth element carboxylate and the phosphoric acid ester repre-sented by the general formula (1) (phosphoric acid ester (P)), and therefore the storage stability is high and the catalytic activity is favorable.

<Method for Producing Conjugated Diene Polymer>

A method for producing a conjugated diene polymer according to the present embodiment includes polymerizing a conjugated diene monomer in the presence of the polym-erization catalyst composition according to the embodiment.

In the embodiment, the polymerization condition is not particularly limited, and a publicly known polymerization condition for a diene-based monomer can be adopted (for example, see EP0375421A1 and the like).

Examples of the conjugated diene monomer include 1,3-butadiene, isoprene (2-methyl-1,3-butadiene), 2,3-dimethyl-1,3-butadiene, 2-chloro-1,3-butadiene, and 1,3-pentadiene. One type of the monomer may be used alone, or two or more types thereof may be used in combination.

With the method according to the present embodiment, when the conjugated diene monomer is a butadiene mono-mer, a butadiene polymer in which the content ratio of cis-1,4-butadiene is 96% or more, preferably 98% or more, and more preferably 99% or more is obtained. Therefore, the butadiene polymer can be suitably applied to a tire for an automobile that requires a decrease in rolling resistance, suppression of cracking, and the like.

EXAMPLES

Hereinafter, the present invention will be described in detail by the use of Examples, but the present invention is not limited to the examples.

Example 1: Preparation of Polymerization Catalyst Composition (1)

In a 1-L flask quipped with a Dean-Stark apparatus, neodymium oxide (45 g) and distilled water (150 g) were placed and then stirred at room temperature for 1 hour. While stirring was continued, cyclohexane (20 g), neodecanoic acid (140 g), and tris(2-ethylhexyl) phosphate (60 g) were added, and the mixture was stirred at 75° C. for 1 hour. The reaction solution was heated to 120° C. and then stirred under reduced pressure (<50 mmHg) for 3 hours. Water and cyclohexane evaporated during the reaction were all removed outside the system. The reaction solution was cooled to 60° C., and cyclohexane (200 g) was then added to obtain a polymerization catalyst composition (1) as a clear purple liquid.

Example 2: Preparation of Polymerization Catalyst Composition (2)

In a 1-L flask quipped with a Dean-Stark apparatus, neodecanoic acid (140 g), tris(2-ethylhexyl) phosphate (60 g), and distilled water (60 g) were placed. Neodymium oxide (45 g) and cyclohexane (20 g) were added with stirring. The reaction solution was heated to 120° C. and then stirred under reduced pressure (<50 mmHg) for 3 hours. Water and cyclohexane evaporated during the reaction were all removed outside the system. The reaction solution was cooled to 60° C., and triethyl phosphate (150 g) and cyclohexane (200 g) were then added to obtain a polymerization catalyst composition (2) as a clear purple liquid.

Comparative Example 1: Preparation of Polymerization Catalyst Composition (3)

In a 1-L flask quipped with a Dean-Stark apparatus, neodymium oxide (45 g) and distilled water (150 g) were placed and then stirred at room temperature for 1 hour. While stirring was continued, cyclohexane (20 g) and neodecanoic acid (140 g) were added, and the mixture was stirred at 75° C. for 1 hour. The reaction solution was heated to 120° C. and then stirred under reduced pressure (<50 mmHg). As a result, the reaction solution was solidified. This solid was not dissolved in cyclohexane, and therefore the solid could not be used as a catalyst.

(Evaluation of Polymerization Catalyst Composition)

For the polymerization catalyst compositions (1) and (2) obtained in Examples 1 and 2, the neodymium content (% by mass), the free acid amount (% by mass), the water content (% by mass), and storage stability were evaluated. The results are listed in Table 1.

(Free Acid Amount)

The free acid amount was determined by an acid-base titration.

(Water Content)

The water content was determined by a Karl-Fischer analysis method.

(Storage Stability)

A sample collected in a screw tube was stored at room temperature. In a case that no abnormality in appearance such as precipitation occurred after elapse of 3 months, the storage stability was evaluated as no problem.

TABLE 1

| Sample | Example 1 | Example 2 |
|---|---|---|
| Neodymium content (wt %) | 8.79 | 8.97 |
| Free acid amount (wt %) | 0.12 | 0.05 |
| Water content (wt %) | 0.25 | 0.22 |
| Storage stability | No problem | No problem |

Example 3: Production of Polybutadiene (Preparations of Catalyst Solution (1))

To a Schlenk tube purged with argon, diisobutylaluminum hydride (7.5 mL), isoprene (1.2 mL), and the polymerization catalyst composition (1) (5.3 mL) were added, and the reaction solution was stirred at 50° C. for 90 minutes. The reaction solution was cooled in an ice bath, a solution (8.0 mL) of 0.25 M ethyl aluminum sesquichloride in hexane was then added, and the mixture was allowed to stand at room temperature overnight. As a result, a catalyst solution (1) was obtained.

(Polymerization of 1,3-Butadiene)

To a pressure-resistant container purged with nitrogen, hexane (37 mL), the catalyst solution (1) (0.07 mL), and 1,3-butadiene (5 g) were added in order, and the reaction solution was stirred at 65° C. for 90 minutes. The reaction solution was added to 400 mL of modified ethanol/hydrochloric acid solution containing bis [3-t-butyl-2-hydroxy-5-methylphenyl]methane (0.1 g), and the deposited polymer was collected and evaporated under reduced pressure at 70° C. to obtain a polybutadiene.

(Yield of Polybutadiene)

The yield of the polybutadiene was calculated by the following equation.

$$(\text{Yield } (\%)) = (\text{weight (g) of dried polybutadiene})/(\text{weight (g) of butadiene used in polymerization}) \times 100$$

As a result, the yield of the polybutadiene was 86%.

(Content of Cis-1,4-Butadiene)

For the polybutadiene dissolved in deuterated chloroform, and $^{13}$C-NMR was measured under the following condition. When a signal belonging to cis-1,4-butadiene was not detected, the content of cis-1,4-butadiene in the polybutadiene was evaluated to be 99% or more.

As a result, the content of cis-1,4-butadiene in the polybutadiene was 99% or more.

<Measurement Condition for $^{13}$C-NMR>

Device: JEOL AL-400

Measurement mode: inverse gated decoupling

Solvent: deuterated chloroform

Sample concentration: 2 wt %

Integration count: 1,000 times

Measuring temperature: 50° C.

Preferable examples of the present invention are described, but the present invention is not limited to the Examples. Addition, omission, replacement, and modification of the components can be made without departing from the spirit of the present invention. The present invention is not limited by the description presented above, but is limited only by the appended claims.

The invention claimed is:

1. A polymerization catalyst composition comprising:

a rare earth element carboxylate; and a phosphate ester represented by the following general formula (1), and no organoaluminum compound;

wherein the polymerization catalyst composition is obtained by a method comprising the following steps (a), (b) and (c):

a step (a) of adjusting a content of a phosphoric acid ester represented by the general formula (1) within a range of 0.01 to 20 eq relative to the rare earth element contained in the rare earth element carboxylate;

a step (b) of adjusting a content of water to 0.5 eq or less relative to the rare earth element contained in the rare earth element carboxylate at a reaction temperature of 80 to 160° C.; and a step (c) of adjusting a total content of free fatty acid and water to 0.6 eq or less relative to the rare earth element contained in the rare earth element carboxylate:

[Formula 1]

$$O\text{=}P(OR)_3 \qquad (1)$$

wherein Rs are each independently an alkyl group having 5 to 20 carbon atoms; and wherein a content of the phosphoric acid ester is 0.01 to 20 eq relative to the rare earth element contained in the rare earth element carboxylate.

2. The polymerization catalyst composition according to claim 1, wherein the rare earth element carboxylate is a carboxylate containing one or more types of rare earth elements selected from the group consisting of neodymium, gadolinium, praseodymium, lanthanum, samarium, and yttrium.

3. The polymerization catalyst composition according claim 1, wherein a content of water is 0.5 eq or less relative to the rare earth element contained in the rare earth element carboxylate.

4. The polymerization catalyst composition according to claim 1, wherein a content of a free fatty acid is 0.1 eq or less relative to the rare earth element contained in the rare earth element carboxylate.

5. A method for producing a conjugated diene polymer, the method comprising polymerizing a conjugated diene monomer in presence of the polymerization catalyst composition according to claim 1.

\* \* \* \* \*